(12) United States Patent
Kee et al.

(10) Patent No.: US 11,722,763 B2
(45) Date of Patent: Aug. 8, 2023

(54) SYSTEM AND METHOD FOR AUDIO TAGGING OF AN OBJECT OF INTEREST

(71) Applicant: MOTOROLA SOLUTIONS, INC., Chicago, IL (US)

(72) Inventors: Chew Yee Kee, Bayan Lepas (MY); Guo Dong Gan, Kuala Lumpur (MY); Guan Lip Soon, Georgetown (MY); Mun Yew Tham, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 27 days.

(21) Appl. No.: 17/444,566

(22) Filed: Aug. 6, 2021

(65) Prior Publication Data

US 2023/0045536 A1 Feb. 9, 2023

(51) Int. Cl.
*H04N 23/611* (2023.01)
*G06V 20/20* (2022.01)
*H04N 23/63* (2023.01)
*G01S 3/808* (2006.01)
*H04R 3/00* (2006.01)

(52) U.S. Cl.
CPC .......... *H04N 23/611* (2023.01); *G01S 3/8083* (2013.01); *G06V 20/20* (2022.01); *H04N 23/635* (2023.01); *H04R 3/005* (2013.01)

(58) Field of Classification Search
CPC .......... H04N 5/23219; H04N 5/232945; G01S 3/8083; G06V 20/20; H04R 3/005
See application file for complete search history.

(56) References Cited

U.S. PATENT DOCUMENTS

| | | |
|---|---|---|
| 4,581,758 A | 4/1986 | Coker et al. |
| 6,829,017 B2 | 12/2004 | Phillips |
| 8,755,432 B2 | 6/2014 | Antonellis et al. |

(Continued)

FOREIGN PATENT DOCUMENTS

| | | |
|---|---|---|
| CN | 105657329 | 11/2018 |
| EP | 3511938 A1 | 7/2019 |

(Continued)

OTHER PUBLICATIONS

Christopher Meffert et al: "Forensic State Acquisition from Internet of Things (FSAioT)", Availability, Reliability and Security, ACM, 2 Penn Plaza, Suite 701 New YorkNY10121-0701USA, Aug. 29, 2017 (Aug. 29, 2017), pp. 1-11, XP058370989, DOI: 10.1145/3098954.3104053, ISBN: 978-1-4503-5257-4, all pages.

(Continued)

*Primary Examiner* — Yogeshkumar Patel (57) ABSTRACT

Techniques for audio tagging of an object of interest are provided. An object of interest within a field of view of a first video camera may be identified at a first time. At least one audio tag representing a first sound created by the object of interest may be generated and associated with the object of interest. At a second time later than the first and at a second video camera, a second sound generated by an unidentified object that is not in the field of view of the second video camera may be detected. An audio tag representing the second tag may be generated. It may be determined that the object of interest and the unidentified object of interest are the same when the audio tag representing the first sound and the second sound are the same.

20 Claims, 5 Drawing Sheets

(56) References Cited

U.S. PATENT DOCUMENTS

| | | |
|---|---|---|
| 8,959,022 B2 | 2/2015 | Cheng et al. |
| 9,679,564 B2 | 6/2017 | Daborn et al. |
| 10,171,769 B2 | 1/2019 | Farrell et al. |
| 10,535,145 B2 | 1/2020 | Lim et al. |
| 10,694,264 B2 | 6/2020 | Van Deventer et al. |
| 10,721,579 B2 | 7/2020 | May et al. |
| 2014/0163982 A1 | 6/2014 | Daborn et al. |
| 2015/0271619 A1 | 9/2015 | Sun et al. |
| 2017/0366896 A1* | 12/2017 | Adsumilli ............... H04N 23/60 |
| 2018/0050800 A1* | 2/2018 | Boykin ............... G08B 13/1966 |
| 2018/0091730 A1* | 3/2018 | Nixon ................. H04N 5/23296 |
| 2019/0236416 A1 | 8/2019 | Wang et al. |
| 2019/0348061 A1* | 11/2019 | Goshen .................. H04R 3/005 |
| 2020/0177655 A1 | 6/2020 | Ong et al. |
| 2021/0027602 A1 | 1/2021 | Correnti |
| 2021/0042533 A1* | 2/2021 | Hodge ............... G08B 13/1966 |

FOREIGN PATENT DOCUMENTS

| | | |
|---|---|---|
| WO | 2011025085 A1 | 3/2011 |
| WO | 2017190803 A1 | 11/2017 |
| WO | 2017211206 A1 | 12/2017 |

OTHER PUBLICATIONS

The International Search Report and the Written Opinion corresponding patent application No. PCT/US2022/037786 filed: Jul. 21, 2022, dated Nov. 7, 2022, all pages.

\* cited by examiner

SYSTEM AND METHOD FOR AUDIO TAGGING OF AN OBJECT OF INTEREST

BACKGROUND

Security cameras have become ubiquitous. It is very likely that whenever a person is in a public place, their image is being captured by one or more public and/or privately owned cameras. In the past, security cameras were passive devices. For example, security cameras may have been connected to video recorders to record what the camera captured. In some cases, the security camera feeds of several different cameras may have been monitored by a human.

Modern surveillance systems make use of video analytics to remove the need for a human to monitor the video feed. Analytics may be used to identify persons in the video stream, based on visual characteristics. For example, a video analytics system may be able to identify all objects in the scene (e.g. humans, cars, etc.). The video analytics system may then be able to automatically annotate those objects with descriptive tags.

For example, in the case of a human object, the system may determine the type of shirt being worn (e.g. red, long sleeves, etc.), the type of pants (e.g. blue jeans, etc.), accessories (e.g. hat, gloves, etc.). Similar annotations may be made for other objects, such as vehicles (e.g. black sedan, etc.). The object identification and added annotations may then be stored in a database. For example, the database may store which camera detected the object, when it was detected, how long it remained in the camera field of view, and the list of annotations, which may be referred to as a feature vector (e.g. a descriptor used to capture all the annotations). This process may occur over several different cameras and time periods.

At a later point in time, it may be desired to determine where a particular object has appeared. The object may be selected in one video source, along with the corresponding feature vector. The database may then be searched to determine all other times/places the object with that feature vector was observed. An analyst may then use this information to determine where/when and individual appeared to determine the path the individual took across the site being covered by the surveillance system. In some cases, this could be expanded to include multiple sites.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Although cameras are becoming more and more prevalent, they may not necessarily cover every square inch of a location that is being monitored. For example, a location may have blind spots where there is no coverage by any camera. In addition, it is possible that a person who is aware of the cameras may take steps to avoid being captured (e.g. avoiding the camera field of view, obstructing the camera, etc.). Thus, when attempting to search for a person of interest via their feature vector, it may be difficult to locate the person as they may not appear in the field of view of additional cameras.

The techniques described herein overcome this problem in part by introducing audio tags. When a person of interest appears in a field of view of a camera, visual descriptive tags (shirt color, pant color, etc.) are generated, just as described above. The cameras may be equipped with microphones/microphone arrays such that any sound generated in the area covered by the camera is captured, and the location of the source of the sound can be determined, and associated with an object if it is determined that the sound was generated from the object.

For example, assume that a human object, wearing a black hoodie and long pants was detected in the field of view of a camera. The human object could be stored in the database along with tags indicating the type of clothing. In addition, assume that the microphone on the camera was able to determine that the person was carrying a set of keys that were "jingling" with a certain sound. Or that they were wearing a set of sneakers that were making a certain sound based on the gait of the person. These audio tags could then be associated with the object feature vector, just as the visual tags are associated with the object.

At a later point in time, it may be decided to determine the movements of a person of interest. As above, the person may be selected from a video image which captured the person of interest. The feature vector of the person of interest may then be used to search the database for any appearances of the person of interest in the field of view of other cameras. Because the feature vector includes audio tags, those can be searched to determine the presence of the person of interest, even when the person is not in the field of view of the camera.

For example, assume the person of interest knows where the camera blind spots are and is making intentional efforts to stay in those blind spots, to avoid the capture of their image. However, the camera may still detect audio produced by the person of interest (e.g. keys jingling, specific sneaker sounds, etc.). Thus, even though the person of interest does not appear in the video image, the fact that sounds associated with the person of interest are present may be sufficient to assume that the person of interest was in the location.

A method is provided. The method includes identifying, at a first time, an object of interest within a field of view of a first video camera, the first video camera generating a first video stream including both video and audio. The method further includes generating at least one audio tag representing a first sound created by the object of interest, the generated audio tag associated with the object of interest. The method further includes detecting, at a second time, the second time later than the first time, at a second video camera, a second sound generated by an unidentified object that is not in a field of view of the second video camera. The method further includes generating an audio tag representing the second sound. The method further includes determining that the object of interest and the unidentified object are the same when the audio tag representing the first sound and the audio tag representing the second sound are the same.

In one aspect, the object of interest is a person. In one aspect, determining the object of interest and the unidentified object are the same further comprises determining if it is physically possible for the object of interest to have moved from a location covered by the first video camera to a location covered by the second video camera in a time period between the first time and the second time.

In one aspect, the method further comprises detecting a distance of the object of interest from the first video camera, using a microphone array on the first video camera to determine a source location of the first sound, and associating the first sound with the object of interest when the source location for the first sound matches a location of the object of interest. In one aspect, the first sound includes a temporal component. In one aspect, the method further comprises associating the at least one audio tag with a second object of interest when it cannot be determined if the object of interest or the second object of interest created the first sound.

In one aspect the method further comprises detecting a distance of the object of interest from the first video camera, detecting a distance of a source location of the first sound from the first video camera based on a magnitude of the first sound, and associating the first sound with the object of interest when the distance of the object of interest and the distance of the source location of the first sound are the same. In one aspect the method further comprises generating at least one visual tag describing a visible feature of the object of interest, the generated visual tag associated with the object of interest.

A system is provided. The system includes a processor and a memory coupled to the processor. The memory contains thereon a set of instructions that when executed by the processor cause the processor to identify, at a first time, an object of interest within a field of view of a first video camera, the first video camera generating a first video stream including both video and audio. The instructions further cause the processor to generate at least one audio tag representing a first sound created by the object of interest, the generated audio tag associated with the object of interest. The instructions further cause the processor to detect, at a second time, the second time later than the first time, at a second video camera, a second sound generated by an unidentified object that is not in a field of view of the second video camera. The instructions further cause the processor to generate an audio tag representing the second sound. The instructions further cause the processor to determine that the object of interest and the unidentified object are the same when the audio tag representing the first sound and the audio tag representing the second sound are the same.

In one aspect the instructions to determine the object of interest and the unidentified object are the same further comprises instructions to determine if it is physically possible for the object of interest to have moved from a location covered by the first video camera to a location covered by the second video camera in a time period between the first time and the second time.

In one aspect the system further comprises instructions to detect a distance of the object of interest from the first video camera, use a microphone array on the first video camera to determine a source location of the first sound, and associate the first sound with the object of interest when the source location for the first sound matches a location of the object of interest. In one aspect the system further comprises instructions to associate the at least one audio tag with a second object of interest when it cannot be determined if the object of interest or the second object of interest created the first sound.

In one aspect the system further comprises instructions to detect a distance of the object of interest from the first video camera, detect a distance of a source location of the first sound from the first video camera based on a magnitude of the first sound, and associate the first sound with the object of interest when the distance of the object of interest and the distance of the source location of the first sound are the same. In one aspect the system further comprises instructions to generate at least one visual tag describing a visible feature of the object of interest, the generated visual tag associated with the object of interest.

A non-transitory processor readable medium containing a set of instructions thereon is provided. The instructions that when executed by a processor cause the processor to identify, at a first time, an object of interest within a field of view of a first video camera, the first video camera generating a first video stream including both video and audio. The instructions further cause the processor to generate at least one audio tag representing a first sound created by the object of interest, the generated audio tag associated with the object of interest. The instructions further cause the processor to detect, at a second time, the second time later than the first time, at a second video camera, a second sound generated by an unidentified object that is not in a field of view of the second video camera. The instructions further cause the processor to generate an audio tag representing the second sound. The instructions further cause the processor to determine that the object of interest and the unidentified object are the same when the audio tag representing the first sound and the audio tag representing the second sound are the same.

In one aspect, the instructions on the medium to determine the object of interest and the unidentified object are the same further comprises instructions to determine if it is physically possible for the object of interest to have moved from a location covered by the first video camera to a location covered by the second video camera in a time period between the first time and the second time.

In one aspect, the instructions on the medium further comprise instructions to detect a distance of the object of interest from the first video camera, use a microphone array on the first video camera to determine a source location of the first sound, and associate the first sound with the object of interest when the source location for the first sound matches a location of the object of interest. In one aspect, the instructions on the medium further comprise instructions to associate the at least one audio tag with a second object of interest when it cannot be determined if the object of interest or the second object of interest created the first sound.

In one aspect, the instructions on the medium further comprise instructions to detect a distance of the object of interest from the first video camera, detect a distance of a source location of the first sound from the first video camera based on a magnitude of the first sound, and associate the first sound with the object of interest when the distance of the object of interest and the distance of the source location of the first sound are the same. In one aspect, the instructions on the medium further comprise instructions to generate at least one visual tag describing a visible feature of the object of interest, the generated visual tag associated with the object of interest.

Further advantages and features consistent with this disclosure will be set forth in the following detailed description, with reference to the figures.

Figure 1:
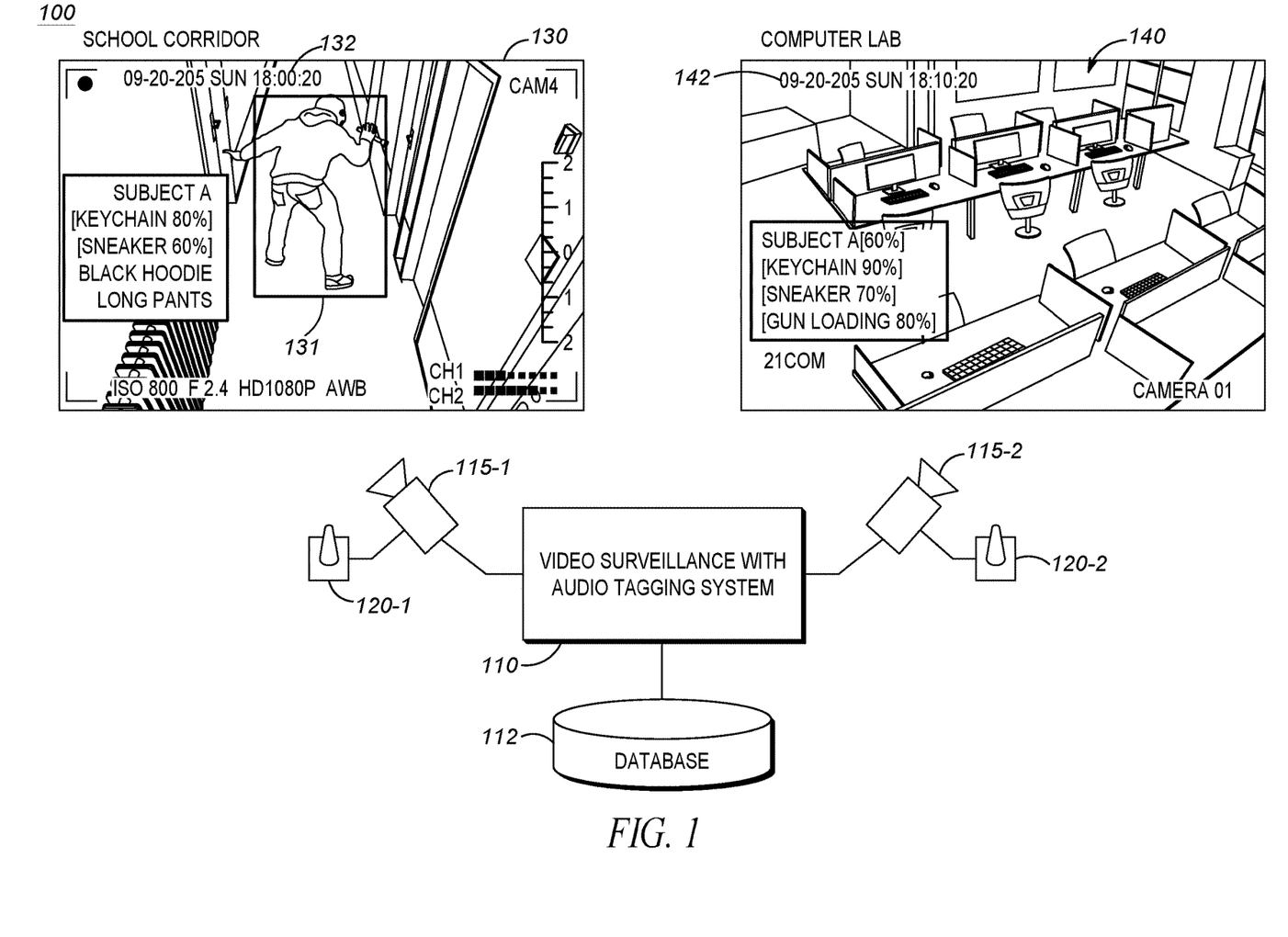
FIG. 1 is an example of a system that may implement the audio tagging of an object of interest techniques described herein.

FIG. 1 is an example of a system that may implement the audio tagging of an object of interest techniques described herein. Environment 100 may include a video surveillance with audio tagging system 110, a database 112, cameras 115-1,2, and microphones 120-1,2 associated with each of the cameras respectively.

Video surveillance with audio tagging system 110 may be implemented as an om premises computing system, a cloud based computing system, or a combination thereof. An example, of a hardware system that may implement the video surveillance with audio tagging system 110 is described with respect to FIG. 3, however, it should be understood that the techniques described herein are not dependent on any particular hardware implementation.

Video surveillance with audio tagging system 110, which may also be referred to as surveillance system 110, may be coupled to database 112. Database 112 may be a searchable database that stores references to objects of interest (e.g. subjects of interest in the case of a human object) as well as the feature vector associated with object of interest. As mentioned above, the feature vector may include visual tags (e.g. black shirt, etc.) as well as audio tags (e.g. keys jingling, etc.).

FIG. 1 includes two cameras 115-1,2. It should be understood that the depiction of two cameras is for purposes of ease of description and is not intended to limit the total number of cameras. An actual implementation of the techniques described herein may include hundreds or even thousands of cameras. Each of the cameras 115 may cover a specific field of view. For example, as shown, camera 115-1 covers a field of view (FoV) that includes a school corridor 130 while camera 115-2 covers a FoV that includes a computer lab 140. It should be understood that the example FoVs are intended to aid in the description. The techniques described herein are not dependent on any particular field of view.

Cameras 115 may capture the image in the field of view for purposes of identifying object of interest and tagging them with visual tags. The identification of the objects of interest and the associated tags may occur in the camera itself (e.g. edge analytics), at the surveillance system 110 (centralized analytics), in a cloud computing environment (not shown), or in any combination thereof. Video analytics may be used to identify objects of interest in the FoV. As shown, FoV 130 includes an object of interest 131, which is a human.

Known video analytics techniques may identify the object 131 (e.g. placing a bounding box around the object) and providing a label for the object. In the present example, object of interest 131 is surrounded by a bounding box, and is given the label "Subject A" which may be stored in the database 112. In addition, known video analytics techniques may be used to determine characteristics. For example, classifiers exist that can identify the type of clothing a subject is wearing, the color of that clothing, and other visual attributes of the subject. As shown in the example, classifiers may be used to identify that subject A is wearing a black hoodie and long pants. These visual tags may also be stored in the database 112, and associated with subject A.

Cameras 115-1,2 may also be coupled to microphones 120-1,2 respectively. In one example, embodiment, the microphones 120 may be microphone arrays that include multiple microphone elements with known spacing between the elements. Through the use of various techniques, such as triangulation, any sound picked up by the microphones 120 can be associated with a specific location in the field of view. If a sound is determined to have been generated from the same location in the FoV of an object of interest, it may be determined that the sound was generated by the object of interest. The sound may then be included as part of the feature vector of the object of interest and stored in the database 112 associated with the object of interest. In some implementations, the microphone arrays 120 may be integrated with the cameras 115, so references to a camera will inherently include the microphone array. However, it should be understood that this is for ease of description, rather than by way of limitation. Some implementations may have a microphone 120 that is not integrated with the camera 115.

The sounds may be processed by known machine learning techniques to identify the sounds. For example, there are datasets available that will allow training of a convolutional neural network (CNN) to detect many different sounds, such as gun shots, keys jingling, etc. One such dataset is the urban acoustic dataset classification (urban sound dataset). It should be understood that the techniques described herein may utilize any currently known or later developed technique for creating a tag associated with an audio sound. It should further be understood that just as with the video tagging, audio tagging may be performed at the microphone 120, the camera 115, the surveillance system 110, the cloud (not shown), or any combination thereof.

In addition to creating tags for known sounds, the audio tags may also include a temporal component. For example, a subject may be wearing shoes (e.g. sneakers) that produce a certain sound when the subject takes a step. In combination with the subject's gait pattern, this may result in an audio tag that includes the sound of the footsteps, but also a pattern of the footsteps associated with the subject's gait. Similarly, clothes rustling could have a distinctive sound as well as pattern associated with the subject's particular form of movement. What should be understood is that regardless of how or where the sounds are identified, the sounds generated by a subject of interest are given an audio tag, and that tag is included as part of the feature vector associated with the subject of interest.

It should be further understood that as with many machine learning techniques, the classification may not be absolute, but rather exists with some confidence level. As shown in FIG. 1, in the school corridor field of view 130, subject A has been shown associated with two audio tags (depicted by tags shown in brackets). The first audio tag is the sound of a keychain and is indicated as 80%. This means that the machine learning algorithm has detected the sound of a keychain with a confidence level of 80% (e.g. 20% chance the sound was not a key chain). The second audio tag is that of sneakers (e.g. shoes, etc.) with a confidence level of 60%. The audio tags may then be stored in the database 112 and associated with subject A. In addition, a date/time stamp 132 may be associated with the captured images. Use of the date/time stamp will be described in further detail below.

In the present example, there is only one object of interest, Subject A, depicted in FoV 130, so it can be assumed that the sound was generated by the singular object of interest. In cases where there is more than one object of interest, techniques that are described in further detail below may be used to determine which object of interest generated the sound based on location triangulation, sound intensity, or other techniques. In some implementations, if it cannot be determined which object of interest generated the sound, the audio tag for the sound may be associated with (e.g. included in the feature vector of) all of the possible objects that could have generated the sound.

In operation, assume at the first time/date stamp 132, the FoV 130 is captured by camera 115-1. A single object of interest, which in this case is a human, and is referred to a Subject A is identified. Two video tags, a black hoodie and long pants are identified and associated with Subject A. The microphone array 120-1 may capture sounds generated by the Subject A. The sounds may be processed by a CNN trained using data to identify sounds to identify which sounds are present. In this case, the sounds identified are a keychain sounds with a confidence level of 80% and sneaker sounds with a confidence level of 60%. Audio tags are generated for these identified sounds. The audio and video tags are then stored in a database 112 and associated with subject A. The collection of audio and video tags may be referred to as a feature vector for subject A.

At some later time 142, camera 115-2, which covers FoV 140 may detect sounds. However, as should be noted, in the FoV 140, there are no objects of interest (e.g. people, other objects, etc.) that have been identified and called out with a bounding box. Thus, the only tags that may be generated would be audio tags. As should be clear, these audio tags cannot be associated with an object of interest in field of view 140, because no object of interest have been identified.

In the present example, the microphone array 120-2 may have identified three sounds. Utilizing the machine learning techniques described above, the presence of a keychain jingling sound may be determined with a confidence level of 90%. Likewise, the presence of sounds generated by sneakers may be determined with a 70% confidence level. A third sound, that of a gun being loaded, may be determined with a confidence level of 80%. In some implementations, the identification of a potentially dangerous sound (e.g. gun loading, gun shots, etc.) may trigger the subject identification process described below. In other implementations, the subject identification process may occur at all times.

The surveillance system 110 will now have a feature vector from FoV 140 that includes the keychain and sneaker audio tags as well as the gun loading audio tag. The surveillance system 110 may then search database 112 for feature vectors that may be close to the feature vector that was identified in FoV 140. In the present example, the feature vector associated with Subject A from FoV 130 is very similar, at least with respect to the audio tags, to the feature vector associated with FoV 140. Based on the similarities in the audio tags, the surveillance system 110 may determine, with a certain level of confidence, that the audio tags generated from FoV 140 were most likely generated by Subject A. The video tags, and associated image of subject A may be retrieved from the database 112.

As an additional check, the surveillance system may check the time/date stamps 132, 142 to determine if it is physically possible for the same subject to have generated the audio tags. For example, in FoV 130, it is shown that the image was captured at 18:00:20 in the school corridor. The image in FoV 140 was captured at 18:10:20 (e.g. a 10-minute difference in time). If the FoV of camera 115-1 and the FoV of camera 115-2 are so far apart that it would not be possible for subject A to travel between the two FoVs within the specified 10-minute timeframe, this would indicate that it was not likely Subject A generated the audio tags in FoV 140.

Once it is determined, with a sufficiently high level of confidence, that the sounds generated in FoV 140 were most likely generated by Subject A (as determined from FoV 130) action can be taken using the full description of Subject A. For example, a request to search for a person wearing a black hoodie and long pants who is likely in possession of a gun may be sent to first responders/security personnel based on the audio tag match, despite the fact that those video tags were not actually generated in FoV 140, where the gun loading sound was detected.

Figure 2:
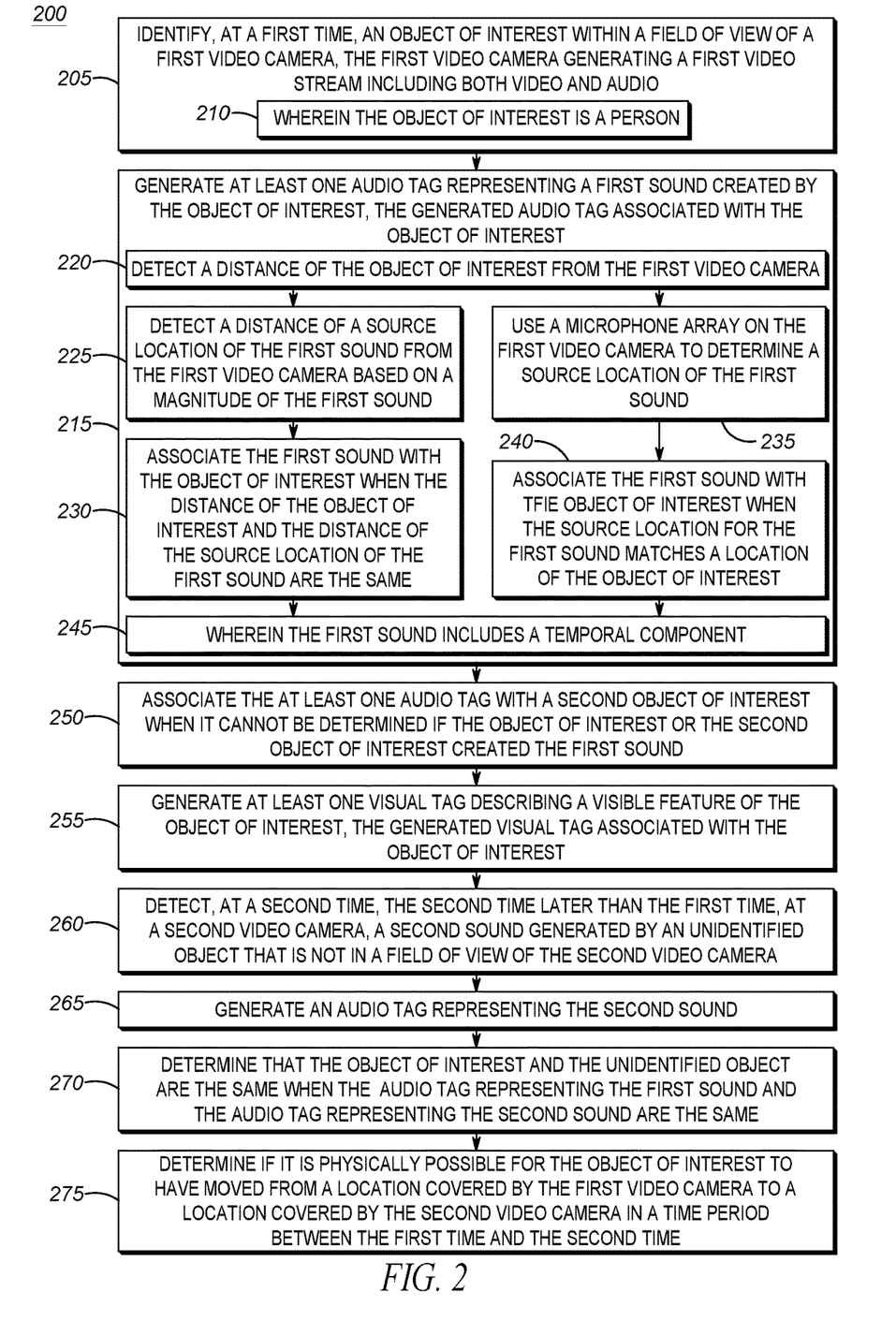
FIG. 2 is an example of a high level flow diagram for implementing the audio tagging of an object of interest techniques described herein.

FIG. 2 is an example of a high level flow diagram 200 for implementing the audio tagging of an object of interest techniques described herein. In block 205, at a first time, an object of interest within a field of view of a first video camera may be identified. The first video camera generating a first video stream including both video and audio. For example, a camera covering a first field of view may identify an object of interest in the field of view. In block 210, the object of interest may be a person. Although the example provided indicated that the object of interest was a human, referred to as a subject, the techniques are not so limited. The object of interest could be anything identifiable via a bounding box (e.g. person, vehicle, animal, etc.).

In block 215, at least one audio tag representing a first sound created by the object of interest may be generated. The generated audio tag may be associated with the object of interest. As explained above, the feature vector for an object of interest may include one or more audio tags. The audio tags may be generated by analyzing the audio using a convolutional neural network trained using a labeled dataset, an example of which is the urban sounds dataset. Although convolutional neural networks are mentioned, the techniques described herein are not limited to that particular mechanisms for machine learning. Any currently available technique for analyzing audio and associating an audio tag with that audio are suitable for use with the techniques described herein.

The audio tag generated may be associated with the object of interest. In one techniques, magnitude of the audio may be used to associate the sound with the object of interest. In another technique, distance may be used to associate the sound with the object of interest. In either case, in block 220, a distance of the object of interest from the first video camera may be detected. For example, this may be done using a technique such as a video image monocular estimate, in which a monocular distance estimate may be generated from the video image via the bounding box. Other techniques such as radar, lidar, sonic measurements, etc., may also be used to determine the distance of the object of interest from the camera. What should be understood is that the distance of the object(s) of interest from the first video camera may be detected.

In one example implementation, the magnitude of the audio signal may be used to detect the distance of the first sound form the first video camera. In block 225, a distance of a source location of the first sound from the first video camera may be detected based on a magnitude of the first sound. In other words, the loudness of the sound may be used to determine how far away from the camera the first sound was generated. Louder sounds would imply the sound was generated closer to the camera, while sounds lower in magnitude would indicate the sound was generated from further away.

In block 230, the first sound may be associated with the object of interest when the distance of the object of interest and the distance of the source location of the first sound are the same. In other words, if the object of interest is located approximately where it is determined that the first sound was generated, the sound may be associated with (e.g. generated from, etc.) the object of interest.

In another example, implementation, the location of the first sound may be determined utilizing microphone arrays that include multiple microphone elements. By taking advantage of the spacing between the elements, the location of the sound can be determined via triangulation. The difference in the time of arrival of the sound at each microphone element due to propagation delay allows for the location of the sound to be determined.

In block 235, a microphone array on the first video camera may be used to determine a source location of the first sound. As explained above, propagation delay of sound to the microphone array allows for calculation of the distance of the sound source to the first camera via triangulation. In block 240, the first sound may be associated with the object of interest when the source location for the first sound matches a location of the object of interest.

It should be noted that the first sound may include a temporal component. For example, a keychain jingling or sneaker footsteps may produce an identifiable sound. However, this sound may vary temporally based on the movement of the object of interest. For example, the pattern of the keychain jingling or sounds made by the sneakers may be related to the gait of the subject. Two separate subjects may carry the same set of keys or wear the same sneakers, but the particular way each subject walks (e.g. their gait) may cause the sound to vary temporally. In block 245, it is noted that the first sound may include a temporal component.

It should be noted that regardless of if the association of the first sound to the object of interest is done via magnitude of the sound or triangulated location of the location of the sound, in cases where there are multiple objects of interest, it may not be possible to definitively associate the sound with a single object of interest. In such cases, in block 250, the at least one audio tag may be associated with a second object of interest when it cannot be determined if the object of interest or the second object of interest created the first sound. In other words, if it cannot be determined which object of interest of two or more objects of interest generated the first sound, the audio tag will be associated with all of the possible objects of interest which may have potentially generated the sound.

In block 255, at least one visual tag describing a visible feature of the object of interest may be generated. The generated visual tag may be associated with the object of interest. As explained above, and in further detail below, when an object of interest is identified based on audio tags only, because the object of interest was not in the FoV of the camera, visual tags generated previously and associated with the object of interest may be used to help identify the object of interest.

In block 260, at a second time, the second time later than the first time, at a second video camera, a second sound generated by an unidentified object that is not in a field of view of the second video camera may be detected. In other words, at a later time, a second camera may detect a second sound, but there is not an object of interest within the FoV of the second camera (e.g. object of interest is in a blind spot, subject is actively evading the FoV of the camera, etc.).

In block 265, an audio tag representing the second sound may be generated. Although only a single sound is described, it should be understood that the techniques are not limited to a single sound. Any number of sounds, and associated audio tags, may be generated.

In block 270, it may be determined that the object of interest and the unidentified object are the same when the audio tag representing the first sound and the audio tag representing the second sound are the same. In other words, if the feature vector of the object of interest includes the same, or similar, sounds as the audio tags generated from the unidentified object, with a sufficiently high level of confidence, it may be concluded that the object of interest and the unidentified object are the same object. As such, visual tags associated with the object of interest can then be imputed onto the unidentified object (e.g. the object that was not in the FoV of the second camera).

In block 275, a mechanism may be provided to reduce the number of false positive matches. In block 275, it may be determined if it is physically possible for the object of interest to have moved from a location covered by the first video camera to a location covered by the second video camera in a time period between the first time and the second time. In other words, if it is not possible for the object of interest to have moved into the area covered by the second video cameras (e.g. too far to walk, too far to drive, etc.) in the timeframe between generating the audio tags at the first camera and the second camera, then it is not possible for the object of interest and the unidentified object to be the same object.

Figure 3:
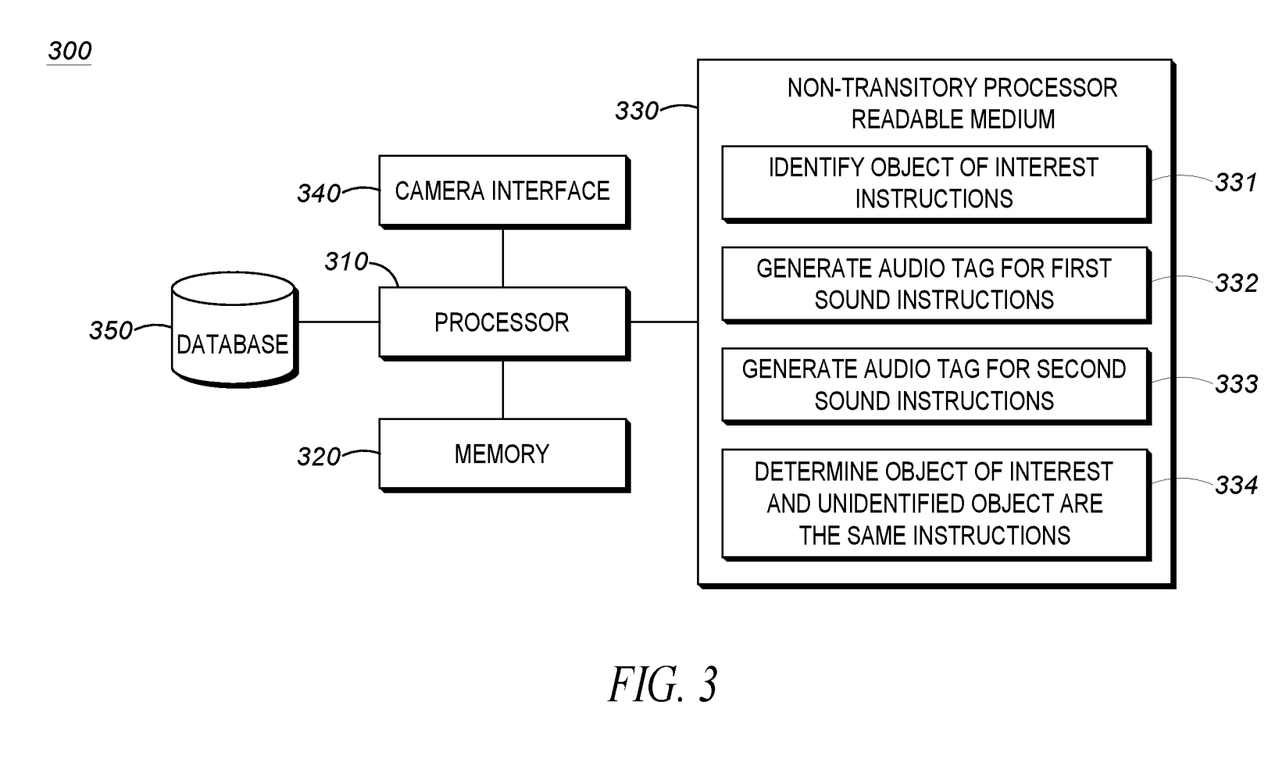
FIG. 3 is an example of a device that may implement the video surveillance with audio tagging system described herein.

FIG. 3 is an example of a device that may implement the audio tagging of object of interest techniques described herein. For example, device 300 may implement the video surveillance with audio tagging system 110. It should be understood that FIG. 3 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, audio analytics, location determination, etc.) could be implemented on multiple devices that are communicatively coupled. FIG. 3 is not intended to imply that all the functionality described above must be implemented on a single device.

Device 300 may include processor 310, memory 320, non-transitory processor readable medium 330, camera interface 340, and database 350.

Processor 310 may be coupled to memory 320. Memory 320 may store a set of instructions that when executed by processor 310 cause processor 310 to implement the techniques described herein. Processor 310 may cause memory 320 to load a set of processor executable instructions from non-transitory processor readable medium 330. Non-transitory processor readable medium 330 may contain a set of instructions thereon that when executed by processor 310 cause the processor to implement the various techniques described herein.

For example, medium 330 may include identify object of interest instructions 331. The identify object of interest instructions 331 may cause the processor to utilize the camera interface 340 to analyze the image included in a FoV of a first camera to identify one or more objects of interests (e.g. people, vehicles, etc.). The identify object of interest instructions 331 are described throughout the specification generally, including places such as blocks 205 and 210.

Medium 330 may also include generate audio tag for first sound instructions 332. The generate audio tag for first sound instructions 332 may cause the processor to access a microphone or microphone array associated with the first camera via the camera interface 340. The processor may identify the type of sound and generate an audio tag associated with that sound. The association may be based on the location of the sound, the location of the object of interest, and/or a magnitude of the sound. In the processor may also generate one or more video tags that are associated with the object of interest. The object of interest, as well as the associated audio and video tags, may be stored in a searchable database 350. The searchable database may be used to associate objects of interest and their associated video tags with unidentified objects of interest. The generate audio tag for first sound instructions 332 are described throughout the specification generally, including places such as blocks 215-245.

Medium 330 may also include generate audio tag for second sound instructions 333. The generate audio tag for second sound instructions 333 may cause the processor to identify a second sound from a second camera via the camera interface 340. An audio tag for the second sound may be created. There may be no object of interest in the FoV of the second camera, causing the processor to associate the second tag with an unidentified object of interest. The generate audio tag for second sound instructions 333 are described throughout the specification generally, including places such as blocks 250-265.

Medium 330 may also include determine object of interest and unidentified object are the same instructions 334. The determine object of interest and unidentified object are the same instructions 334 may cause the processor to compare the second audio tag with the feature vector for the object of interest, by accessing the feature vector via the database 350. If a match is found, the unidentified object may be determined to be the same as the object of interest. As such, the video tags associated with the object of interest can be associated with the unidentified object, even though those visual features were never detected by the second camera. The determine object of interest and unidentified object are the same instructions 334 are described throughout the specification generally, including places such as blocks 270 and 275.

Figure 4:
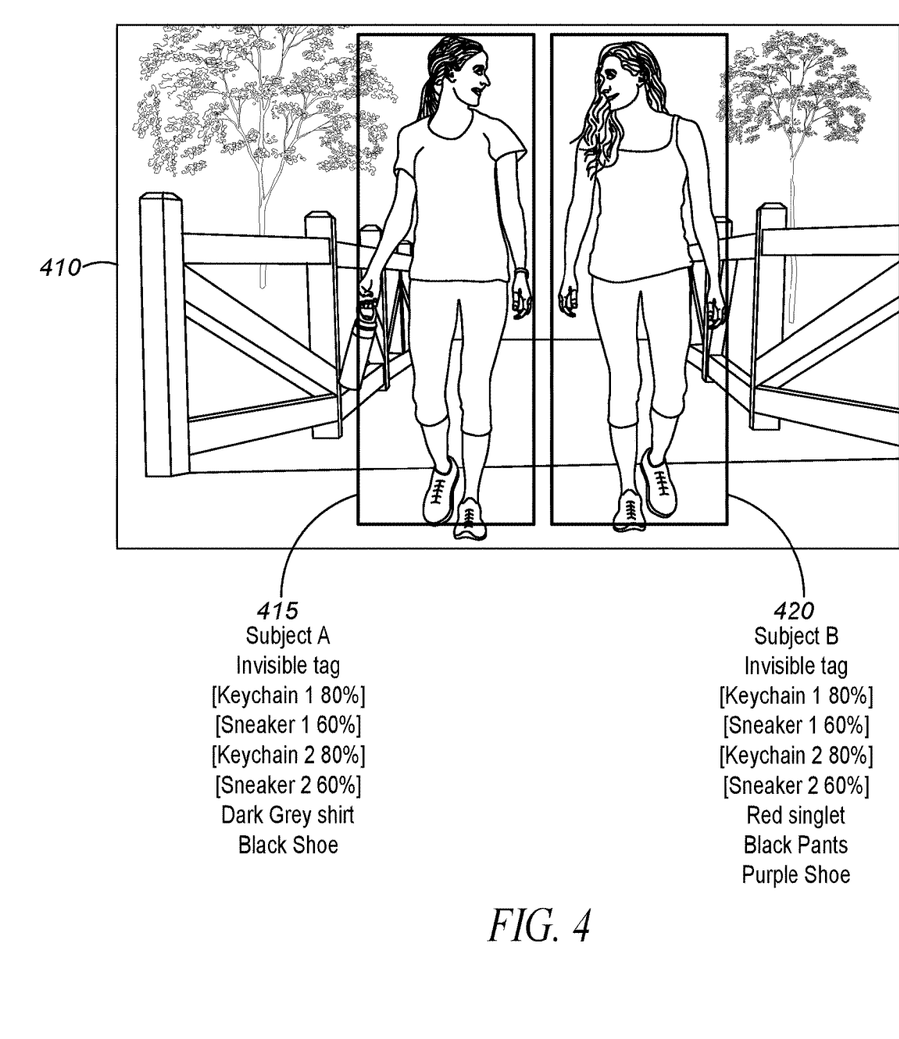
FIG. 4 is an example of an ambiguous set of audio tags being associated with multiple objects of interest.

FIG. 4 is an example of an ambiguous set of audio tags being associated with multiple objects of interest. As mentioned above, in some cases there may be more than one object of interest identified within the field of view of a camera. As shown in FIG. 4, two objects of interest are shown in the FoV 410 of a camera. Subject A is identified by bounding box 415, while subject B is represented by bounding box 420.

Each subject may have certain video tags associated with them. For example, as shown, Subject A is associated with the visual tags of dark grey shirt and black shoes, while subject B is associated with the visual tags of red singlet, black pants, and purple shoes. Because the objects of interest are clearly visually defined within the bounding box, there is no ambiguity as to the video tags for each object.

On the other hand, given the close proximity of the two objects of interest, it may not be possible to definitively associate a sound with a particular object of interest. For example, the jingling of two different sets of keys (keychain 1, keychain 2) or two different sets of sneakers (sneaker 1, sneaker 2) may be identified, but the system is unable to determine which object of interest generated each sound.

In order to overcome this problem, all objects of interest, in this case Subject A and B, that may have generated the sound are associated with the audio tag. As shown, both subject A and subject B are each tagged with the keychain 1 and keychain 2 audio tags as well as the sneaker 1 and sneaker 2 audio tags.

If at some point in time the two objects of interest separate from each other, the audio tags can be further refined. For example, if subject A is captured in the FoV of a second camera and only the sounds associated with keychain 1 and sneakers 1 are present, then it can be determined that Subject A did not generate the keychain 2 and sneaker 2 audio tag, because if it did, those sounds would also be present. As such, the audio tags for keychain 2 and sneaker 2 can be disassociated with Subject A. Likewise, because it has been determined that the sounds from keychain 1 and sneakers 1 were generated from Subject A, those audio tags can be disassociated from subject B.

Figure 5:
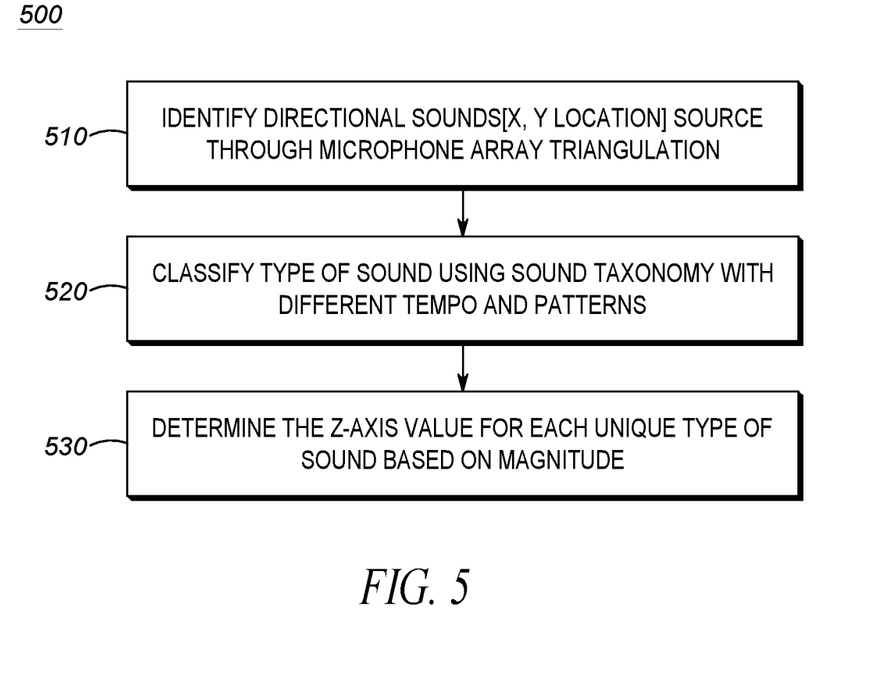
FIG. 5 is an example of a high level flow diagram for determining the location of a sound within the field of view of a camera.

FIG. 5 is an example of a high level flow diagram 500 for determining the location of a sound within the field of view of a camera. In block 510, directional sound sources may be identified (e.g. x,y coordinates) via, for example, microphone array triangulation. As explained above, the microphones associated with the cameras may be microphone arrays that include multiple elements. By utilizing the space between the microphone elements and the propagation delay of traveling sound, an (x,y) coordinate of the source of the sound generation in the field of view of the camera can be determined. Although microphone array triangulation has been mentioned, it should be understood that the techniques described herein are not so limited. Any mechanism for detecting the (x,y) coordinates of the source of sound generation would be suitable.

In block 520, the type of sound may be classified using sound taxonomy with different tempo and patterns. As explained above, there are numerous techniques using machine learning trained with sound data sets (e.g. urban sound dataset, etc.) that may be used to identify the type of sound detected. These techniques allow the type of sound to be identified (e.g. keychain jingling, etc.).

In block 530, the z-axis value for each unique type of sound may be determined based on the magnitude. The sound identification techniques described in step 520 may identify the sound as well as provide information related to the expected magnitude of the sound. For example, a keychain rattle may be expected to have a low magnitude. The greater the magnitude detected (e.g. louder), the closer to the microphone the source of the sound generation is (e.g. higher z-axis value). By using the expected magnitude of the sound compared with the actual magnitude, a z-axis for the source of the sound determination may be made.

Once the source location of the sound is determined in the field of view of the camera, an object of interest in that location may be associated with the sound (e.g. audio tag associated with the object of interest). It should be understood that the techniques described in steps 510 and 530 may be used together or independently. For example, in some implementations, the (x,y) coordinates may be sufficient to associate audio tags. In other implementations, the magnitude of the sound alone may be used to associate audio tags.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot implement a machine learning CNN to detect and classify audio tags from a microphone, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    identifying, at a first time, an object of interest within a field of view of a first video camera, the first video camera generating a first video stream including both video and audio;
    generating at least one audio tag representing a first sound created by the object of interest, the first sound captured by a microphone associated with the first video camera, the generated audio tag associated with the object of interest;
    detecting, at a second time, the second time later than the first time, at a second video camera, a second sound generated by an unidentified object that is not in a field of view of the second video camera;
    generating an audio tag representing the second sound; and
    determining that the object of interest and the unidentified object are the same when the audio tag representing the first sound and the audio tag representing the second sound are the same.

2. The method of claim 1 wherein the object of interest is a person.

3. The method of claim 1 wherein determining the object of interest and the unidentified object are the same further comprises:
    determining if it is physically possible for the object of interest to have moved from a location covered by the first video camera to a location covered by the second video camera in a time period between the first time and the second time.

4. The method of claim 1 further comprising:
    detecting a distance of the object of interest from the first video camera;
    using a microphone array on the first video camera to determine a source location of the first sound; and
    associating the first sound with the object of interest when the source location for the first sound matches a location of the object of interest.

5. The method of claim 1 wherein the first sound includes a temporal component.

6. The method of claim 1 further comprising:
    associating the at least one audio tag with a second object of interest when it cannot be determined if the object of interest or the second object of interest created the first sound.

7. The method of claim 1 further comprising:
    detecting a distance of the object of interest from the first video camera;
    detecting a distance of a source location of the first sound from the first video camera based on a magnitude of the first sound; and
    associating the first sound with the object of interest when the distance of the object of interest and the distance of the source location of the first sound are the same.

8. The method of claim 1 further comprising:
    generating at least one visual tag describing a visible feature of the object of interest, the generated visual tag associated with the object of interest.

9. A system comprising:
    a processor; and
    a memory coupled to the processor, the memory containing thereon a set of instructions that when executed by the processor cause the processor to:
        identify, at a first time, an object of interest within a field of view of a first video camera, the first video camera generating a first video stream including both video and audio;
        generate at least one audio tag representing a first sound created by the object of interest, the first sound captured by a microphone associated with the first video camera, the generated audio tag associated with the object of interest;
        detect, at a second time, the second time later than the first time, at a second video camera, a second sound generated by an unidentified object that is not in a field of view of the second video camera;
        generate an audio tag representing the second sound; and determine that the object of interest and the unidentified object are the same when the audio tag representing the first sound and the audio tag representing the second sound are the same.

10. The system of claim 9 wherein the instructions to determine the object of interest and the unidentified object are the same further comprises instructions to:
   determine if it is physically possible for the object of interest to have moved from a location covered by the first video camera to a location covered by the second video camera in a time period between the first time and the second time.

11. The system of claim 9 further comprising instructions to:
   detect a distance of the object of interest from the first video camera;
   use a microphone array on the first video camera to determine a source location of the first sound; and
   associate the first sound with the object of interest when the source location for the first sound matches a location of the object of interest.

12. The system of claim 9 further comprising instructions to:
   associate the at least one audio tag with a second object of interest when it cannot be determined if the object of interest or the second object of interest created the first sound.

13. The system of claim 9 further comprising instructions to:
   detect a distance of the object of interest from the first video camera;
   detect a distance of a source location of the first sound from the first video camera based on a magnitude of the first sound; and
   associate the first sound with the object of interest when the distance of the object of interest and the distance of the source location of the first sound are the same.

14. The system of claim 9 further comprising instructions to:
   generate at least one visual tag describing a visible feature of the object of interest, the generated visual tag associated with the object of interest.

15. A non-transitory processor readable medium containing a set of instructions thereon that when executed by a processor cause the processor to:
   identify, at a first time, an object of interest within a field of view of a first video camera, the first video camera generating a first video stream including both video and audio;
   generate at least one audio tag representing a first sound created by the object of interest, the first sound captured by a microphone associated with the first video camera, the generated audio tag associated with the object of interest;
   detect, at a second time, the second time later than the first time, at a second video camera, a second sound generated by an unidentified object that is not in a field of view of the second video camera;
   generate an audio tag representing the second sound; and
   determine that the object of interest and the unidentified object are the same when the audio tag representing the first sound and the audio tag representing the second sound are the same.

16. The medium of claim 15 wherein the instructions to determine the object of interest and the unidentified object are the same further comprises instructions to:
   determine if it is physically possible for the object of interest to have moved from a location covered by the first video camera to a location covered by the second video camera in a time period between the first time and the second time.

17. The medium of claim 15 further comprising instructions to:
   detect a distance of the object of interest from the first video camera;
   use a microphone array on the first video camera to determine a source location of the first sound; and
   associate the first sound with the object of interest when the source location for the first sound matches a location of the object of interest.

18. The medium of claim 15 further comprising instructions to:
   associate the at least one audio tag with a second object of interest when it cannot be determined if the object of interest or the second object of interest created the first sound.

19. The medium of claim 15 further comprising instructions to:
   detect a distance of the object of interest from the first video camera;
   detect a distance of a source location of the first sound from the first video camera based on a magnitude of the first sound; and
   associate the first sound with the object of interest when the distance of the object of interest and the distance of the source location of the first sound are the same.

20. The medium of claim 15 further comprising instructions to:
   generate at least one visual tag describing a visible feature of the object of interest, the generated visual tag associated with the object of interest.

* * * * *